United States Patent [19]
Cui et al.

[11] Patent Number: 6,136,229
[45] Date of Patent: Oct. 24, 2000

[54] METHOD FOR THE MECHANOCHEMICAL PREPARATION OF HIGH PERFORMANCE CERAMICS

[75] Inventors: Changxing Cui, Whippany; Ji Su, Highland Park; Ray H. Baughman, Morris Plains, all of N.J.

[73] Assignee: AlliedSignal Inc., Morristown, N.J.

[21] Appl. No.: 09/173,428

[22] Filed: Oct. 15, 1998

[51] Int. Cl.$^7$ ........................................ H01B 1/06
[52] U.S. Cl. .................. 252/518.1; 252/500; 252/519.2; 252/62.9 R; 252/62.9 PZ; 252/62.62; 501/134; 501/135
[58] Field of Search ..................... 501/134, 135; 252/62.9 R, 62.9 PZ, 500, 512, 513, 518.1, 519.2, 62.62; 156/62.3, 621; 423/593; 264/117; 426/618

[56] References Cited

U.S. PATENT DOCUMENTS

| | | | |
|---|---|---|---|
| 5,112,433 | 5/1992 | Dawson et al. | 156/623 R |
| 5,628,945 | 5/1997 | Riman et al. | 264/117 |
| 5,721,182 | 2/1998 | Reichert et al. | 501/134 |

*Primary Examiner*—Yogendra Gupta
*Assistant Examiner*—Derrick G. Hamlin
*Attorney, Agent, or Firm*—Larry J. Palguta

[57] ABSTRACT

Disclosed are mechanochemical processes for the synthesis of high performance electroceramics from organometallic precursors, and compositions resulting from the processes.

31 Claims, No Drawings

METHOD FOR THE MECHANOCHEMICAL PREPARATION OF HIGH PERFORMANCE CERAMICS

This invention relates to mechanochemical processes for the synthesis of high performance electroceramics from organometallic precursors, and to compositions resulting from these processes.

BACKGROUND OF THE INVENTION

While electroceramics are used in a host of commercially important applications, the achievable performance of multi-element ceramic compositions is frequently impaired by difficulties in achieving desired chemical and phase compositions. For describing the nature of these problems, it is useful to consider the specific cases of lead metaniobate ($Pb(NbO_3)_2$) and lead magnesium niobate ($PbMg_{1/3}Nb_{2/3}O_3$) phases, which could have increased applicability as high performance ferroelectrics if the materials quality could be improved, especially using inexpensive processing methods.

Goodman (J. Am. Ceram. Soc., vol. 36, pp. 368–372, 1952, U.S. Pat. No. 2,729,757) first prepared lead metaniobate by reacting a mixture of $PbSO_4$ and $Nb_2O_5$. The $PbSO_4$ decomposes to form highly reactive PbO, which reacts with the $Nb_2O_5$. The resulting reaction product is a mixture of orthorhombic lead metaniobate and an undesired pyrochlore phase $Pb_2Nb_2O_7$. Also, calcinating a stoichiometric mixture of metal oxides does not provide high quality lead metaniobate powder. For example, sintering a compacted disk made from a mixture of PbO and $Nb_2O_5$ fine powders (at about 950° C. under oxygen flow for 15 days) is associated with the volatilization of lead oxide, which makes it difficult to control chemical composition and phase purity (see Rivolier et al., Eur. J. Solid State Inorg. Chem., vol. 32, pp. 251–262, 1995; U.S. Pat. No. 2.729,575). In addition, U.S. Pat. No. 4,234,558 to Arendt and Rosolowski describes the preparation of this ceramic powder by the molten salt method. However, the resulting powder contains not only an undesired phase, but also contaminants from the salts, which degrade the performance of the ceramic as a ferroelectric. Yamaguchi and Mukaida (J. Mat. Sci. Lett., Vol. 9, pp. 556–558, 1990) prepared rhombohedral lead metaniobate by the co-precipitation method using an alkoxy precursor route. Boulmaaz et al. (J. Mat. Sci. Vol. 7, pp. 2053–2061, 1997) later found that similar methods produced the undesired $PbNb_4O_{11}$ as an impurity phase. Matra et al. (J. Thermal Analysis, Vol. 44, pp. 431–440, 1995) attempted to produce lead metaniobate powder by a co-precipitation method starting from dissolving inorganic salts in acidified water, but no details concerning phase purity or phase composition were provided.

Lead magnesium niobate (PMN) is a perovskite that is a relaxor ferroelectric. Like lead metaniobate, it is very difficult to synthesize as a pure phase because conventional solid-state reaction methods result in the formation of a very stable pyrochlore phase. Although some researchers have reported the successful synthesis of this ceramic, such synthesis involves repeated calcinations at high temperatures and long sintering times. Consequently, it is difficult to control the stoichiometry of the ceramic because of the loss of PbO (S. J. Sang et al., Ferroelectrics, Vol. 27, pp. 31–35, 1980). Swartz and Shrout (Mat. Res. Bull., Vol. 17, pp. 1245–1250, 1982) have described a process for minimizing the formation of the pyrochlore phase. For this process, which involves sintering a pellet compacted from a stoichiometric mixture of the columbite phase ($MgNb_2O_6$) and lead oxide, these researchers reported forming about 99% perovskite. This is called the columbite method. The addition of a few percent excess of MgO is reported to further decrease the amount of the pyrochlore phase. The addition of excess of PbO is also reported to have the same effect (LeJeune, M. and Boilot, J. P., Am. Ceram. Soc. Bull., Vol. 64, pp. 679–684, 1985). Application of sol-gel methods for this ceramic provides controversial results. Chaput et al. (J. Am. Ceram. Soc., Vol. 72, pp. 1335–1357, 1989) reported that a pure perovskite phase could be obtained, but Fukui et al. (J. Ceram. Soc. Japan., Vol. 102, pp. 393–396, 1994) later found a significant amount of the pyrochlore phase. Currently, the PMN related electroceramic is prepared mainly by the columbite method.

Mechanochemical synthesis is a solid-state synthesis technique in which the synthesis process is initiated or facilitated by a mechanical process, such as grinding. This technique has been rarely used in preparation of ferroelectrics, since mechanochemical reaction between metal oxides usually proceeds to less than 50% completion even under high-energy milling condition.

Streleskii and Borunova have mechanochemically synthesized lead metaniobate, $PbNb_2O_6$, and other lead-oxide-related ceramics (Proceedings of the First International Conference on Mechanochemistry, Vol. 1, pp. 98–101, 1993). In another effort to use mechanochemistry, Komasubara et al. (J. Amer. Ceram. Soc., Vol. 77, pp. 278–282, 1994) prepared lead titanate, $PbTiO_3$, by milling a mixture of dried lead and titanium sol-gels. There are indications that the milling induced some degree of mechanochemical reactions between the sol-gels. Using a similar approach, Hamada et al. (J. Mat. Sci. Lett., vol. 15, pp. 603–605 1996) prepared magnesium titanate, $MgTiO_3$, precursors by milling (1) $TiO_2$ and $Mg(OH)_2$ mixtures and (2) $TiO_2$ and MgO sol-gel mixtures. These researchers found that mechanical milling could affect the crystallization behavior of the products during sintering. Balaz et al. (J. Mat. Sci., vol. 29, pp. 4847–4851, 1994) and Abe and Suzuki (Mat. Sci. Forum, vols. 225–227, pp. 563–568, 1996) employed mechanochemical phenomena in the preparation of barium titanate, $BaTiO_3$, fine powder. In this work, Balaz used mechanical milling to mechanically activate a mixture of $BaCO_3$, $TiO_2$ and PbO. Such activated mixture offered a $BaTiO_3$ powder having a narrow particle size distribution after thermal treatment at 1100° C. Abe et al. used high energy planetary ball milling to initiate a mechanochemical reaction between $TiO_2$ and $Ba(OH)_2$. A poorly crystalline $BaTiO_3$ was obtained. Other researchers have attempted the preparation of barium hexaferrite powders using a similar approach (Solid State Ionics, Vol. 101–103, pp. 103–109, 1997). Baek et al. synthesized lead magnesium niobate-lead titanate (PMN-PT) without pyrochlore phase by sintering a stoichiometric mixture of PbO, $TiO_2$, $Nb_2O_3$ and $Mg(OH)_2$ which had been treated by mechanical milling (Mat. Sci. Forum, Vols. 235–238, pp. 115–120, 1997). Such milling could potentially cause reaction between $Nb_2O_5$ and $Mg(OH)_2$ to form the Columbite phase $MgNb_2O_6$, which might be why they did not find any pyrochlore phase. Awano and Takagi (J. Ceram. Soc. Japan, Vol. 101, pp. 124–128, 1993) tried the mechanical grinding of a gel powder prepared from $La_2O_3$, $Pb(NO_3)_2$, and $TiCl_4$—Zr-oxychloride to promote mechanochemical reactions for the synthesis of lead lanthanum zirconate titanate, PLZT [$(Pb_{0.92}La_{0.08})(Zr_{0.65}Ti_{0.35})_{0.98}O_3$]. Isobe et al. also employed ball milling of a powdered mixture of two gels (prepared from mixing $ZrO_2$ and $TiO_2$ sols) to produce a precursor for $ZrTiO_4$ ceramics (Mat. Res. Symp. Proc.: Better Ceramics through Chemistry VI, pp.273–277, 1994).

In the prior art, compositional heterogeneity, unexpected by-products, incomplete reactions, contaminates, and strong aggregation are disadvantages which restrict the applicability of mechanochemical processes for advanced ceramic preparation (Abe and Narita, Solid State Ionics, Vols. 101–103, pp. 103–109, 1997). Several methods have been utilized by the prior art in efforts to improve this technology, which include hydrothermal enhancement of mechanochemical synthesis (Kosova et al., Solid State Ionics, Vols. 101–103, pp. 53–58, 1997), the use of high energy planetary mills (Abe and Narita, Solid State Ionics, Vols. 101–103, pp. 103–109, 1997), and hydroxide-group-modified mechanochemical interaction, which introduces OH groups to adjust surface acidity or basicity (Senna et al., Mat. Sci. Forum, vols. 225–227, pp. 521–526, 1996). The above efforts in process improvement are based on the physical modification of the presently existing mechanochemical synthesis. No significant improvements were achieved, especially with respect to improving compositional homogeneity, degree of the reaction, and the elimination of by-products.

DETAILED DESCRIPTION OF THE INVENTION

This invention discloses novel mechanochemical processes for the preparation of high quality electroceramic powders. In contrast to the mechanochemical processes of the prior art, the present invention uses mechanically-soft organometallic compositions (coordination compounds, metal complexes, or metal organic salts) as starting materials. This invention shows that the mechanochemical reaction between organometallic compounds can proceed nearly quantitatively if the ligands on these compounds are properly chosen. As a result of such high reaction yield, nearly complete atomic level mixing can be achieved for the metal oxide product obtained by thermal decomposition of the mechanochemical reaction product. This invention also shows that the desired phases can be formed in high purity at lower temperatures and in shorter reaction times than for prior art methods. In addition to being applicable for easily prepared ceramics (such as lead titanate and lead zirconate titanate), the methods of this invention are also applicable for those electroceramics that are difficult to prepare as high quality materials by any prior art method (such as lead metaniobate and lead magnesium niobate)

Processes of this invention use the following steps. First, organometallic complexes and organic metal salts were mixed in a stoichiometric ratio corresponding to the targeted ceramic. Second, the above mixture is ground or otherwise mechanically deformed so that mechanochemical reaction occurs between these metal complexes, thereby forming an electroceramic precursor. The mechanical grinding is most preferably performed until the mechanochemical reaction is nearly complete. Various mechanical deformation methods well known in the prior art can be used, such as ball-milling, attrition milling, and planetary milling. Third, the above precursor is thermally decomposed, at a temperature of preferably above 300° C., to form high quality electroceramic powder. Fourth, the resulting high quality electroceramic powder can be used to make various green ceramic parts by compacting them using prior art methods. This green ceramic can be fired to provide the targeted shaped ceramic.

In contrast with the above, conventional ceramic processing involves combining metal oxide powders in the desired stoichiometric ratio and mixing these metal oxide powders by ball milling or other milling methods. Next, the powder mixture is calcinated at high temperatures. The calcinated product is then ground into a fine powder, to which binders, lubricants, sintering aids, etc. are added, for the formation of variously shaped green ceramic parts. Finally, the desired ceramic is obtained by firing the green ceramic. This method is economically attractive and suitable for the large scale production of certain ceramics. However, many ceramics of interest cannot be obtained in high phase purity by this approach. For example, a second undesired phase forms in high concentration when this method is used for the preparation of lead magnesium niobate powder (S. J. Sang, et al., Ferroelectrics, Vol. 27, pp. 31–35, 1980). Stoichiometric composition control is problematic (because of the loss of lead oxide), calcination times are long, and unwanted phases are produced when applying this prior art method to produce lead metaniobate (G. Goodman, J. Am. Ceram. Soc., vol. 36, pp. 368–372, 1952). The methods of the present invention enable the preparation of these electroceramics as high quality materials. As shown in the examples of this invention, the lead metaniobate ceramic powder prepared by a method of the present invention has an impurity phase concentration that is too low for convenient detection. In the case of the synthesis of lead magnesium niobate, the amount of the undesired pyrochlore phase can be reduced to below 1% by using the methods of this invention.

The prior art has described the use of organometallic compounds as precursors for desired electroceramics (Boulmaaz, S. et al. J. Mater. Chem., Vol. 7, pp. 2053–2061, 1997). These organometallic compounds are hydrolyzed to form a co-precipitate of various metal hydroxides or insoluble metal ion salts, such as metal carbonate and metal oxalate. The calcination of the co-precipitate then yields the desired ceramic powder. However, this approach suffers from several problems. First, the synthesis of the required organometallic precursor is complicated. This synthesis must be conducted under a protective environment, because it involves metal alkoxides that are sensitive to moisture and flammable in air. As a result, this route can not be easily adapted for large-scale production. Second, it is difficult to form the desired atomic level mixing of various metal oxides by this method, because different metal ions precipitate at different pH values. Third, this prior-art method is not useful for the synthesis of electroceramics that can not be made by conventional ceramic processing methods. For example, a second, unwanted phase always forms in significant amounts during the synthesis of lead metaniobate and lead magnesium niobate. On the contrary, the processes of the present invention do not require the synthesis of organometallic compounds that are moisture sensitive and flammable. The precursor is made by mixing metal-organic ligand complexes and mechanically initiating reaction between them. The resulting reaction product is structurally related to the targeted ceramic. Although it is possible to hydrolyze such a precursor made by the process of the present invention, it is preferred to directly thermally decompose this precursor, so as to avoid the above mentioned problems. The product of calcination is a true atomic level mixing of metal oxides. The presence of this mixing successfully avoids the formation of heterogeneous mixture of metal oxides which occurs during the hydrolysis of the precursor compounds of the prior art.

The present invention method provides key advantages over the alcohol dehydration approach of the prior art (Mulder, B. J., Ceramic Bulletin, Vol. 49, pp. 990–993, 1982). These advantages of the present invention result since the mechanochemical reaction produces a metal-organic-ligand complex ceramic precursor having a structure and composition that is similar to that of the desired ceramic. The metal atoms are in the desired close proximity for bonding during calcination. On the contrary, the alcohol dehydration method does not involve a chemical reaction between the precursor metal ion citrates. The co-precipitate formed in the prior art method from dehydration of an aqueous solution of metal ion citrates is not a true atomic-level mixture. This is because the less-water-soluble citrates will precipitate before those that are highly soluble in water. The thermal treatment temperatures for the formation of desired phases by the processes of the present invention are very low compared with those required for the alcohol dehydration method. The examples of this invention demonstrated this point. For example, in the synthesis of lead titanate from the precursor prepared from lead acetate and titanium oxalate, a well-crystallized powder of the desired product was obtained at 600° C. The powder prepared at the same temperature by the citrate alcohol dehydration method does not show a powder x-ray diffraction pattern characteristic of the desired highly crystalline product (Han, K., "Effect of Processing Variables on Dielectric and Piezoelectric Properties of 0–3 Ceramic-Polymer Composites", Ph.D. Thesis, Rutgers University, New Brunswick, N.J., 1992). Similarly, a significant amount of the desired rhombohedral lead metaniobate formed at 600° C. when lead metaniobate was prepared by a method of the present invention. In contrast, the prior-art method requires higher temperatures for the formation of this product.

The present invention also avoids a key problem associated with the alcohol dehydration approach to preparing electroceramics from citrates. This prior-art approach requires that the metal components of the ceramic can be prepared in the form of water soluble metal citrates. If water soluble metal citrates can not be prepared, this approach can not be used. Relevant for the case where niobium is a required component in the ceramic, niobium citrate can not be directly prepared from niobium oxide. Instead, the citrate must be prepared from a freshly prepared niobic acid. Most important, the stability of niobium citrate in water is not high and it easily hydrolyzes into niobium oxide. Thus, the prior-art citrate route is not practical for the preparation of niobium-containing ceramics. The processes of the present invention do not require the metal complexes to be stable in water. This is demonstrated in the examples of this patent application, where lead metaniobate and lead magnesium niobate were successfully prepared.

Although mechanochemical methods have been used to prepare electroceramics in prior art technology, this prior art technology is quite different from that of the present invention, and less effective. The compositional heterogeneity, unexpected by-products, incomplete reactions, contaminates, and strong aggregations are some disadvantages of the mechanochemical methods of the prior art (Abe and Narita, Solid State Ionics, vols. 101–103, pp. 103–109, 1997). The mechanochemical methods of this prior art can be classified into three categories. The first category of prior-art mechanochemical synthesis involves the simple high-energy milling of metal oxides mixtures. The reaction among metal oxides is not complete, generally less than 50%, and the mechanochemical reaction product is not well defined. The second category of mechanochemical synthesis processes involves the mechanochemical reaction of metal hydroxides, such as $Mg(OH)_2$ and $Ti(OH)_4$. A mixture of metal oxides and hydroxides are first milled at reasonably high energy to form a partially reacted mixture of metal oxides and hydroxides. Then the above mixture is calcinated at high temperatures. The third category of mechanochemical processes lies between ordinary unreactive milling and mechanochemical reaction. The aim is to cause a high level of physical mixing between different ceramic components by bringing the metal oxides particles to very small sizes. A limited degree of chemical reactions might occur during this process. For example, Komasubara et al. (J. Amer. Ceram. Soc., Vol. 77, 278, 1994) ball milled a mixture of sol-gels of lead hydroxide and titanium hydroxide. Calcination of the milled sol-gel mixture at 600° C. produced lead titanate, $PbTiO_3$. These prior art applications of the mechanochemical approach can be contrasted with that of the present invention, both from the viewpoint of choice of precursors and the effectiveness of the process in delivering a high quality ceramic product.

According to the present invention, barium titanate can be prepared from barium acetate and titanium oxalate by grinding these materials together, so as to cause solid-state reaction between them (as shown in the examples of this invention). Indeed, a very strong acetic acid smell was detected when barium acetate and titanium oxalate were ground together. Further ball-milling of the resulting powder offered a glue-like material, which provides further evidence for the occurrence of a solid-state reaction. The thermal decomposition of the glue-like material resulted in the formation of barium titanate.

The first step of the mechanochemical processing methods of this invention is to select suitable metal complexes (such as metal ion organic salts) for use as precursors. The metal complexes that are suitable for this invention fall into two groups. The first group of metal complexes has a general formula $MA\text{-}LA_x$ where MA is the metal center and LA is the ligand. The key requirement for the ligand LA is that it can react with other metal complexes to form a new compound without destroying its bonding with MA. The second group of metal complexes has a general formula $MB\text{-}LB_y$, where MB is the metal center and LB is the ligand. MB should have a higher affinity for LA than LB. The general reaction scheme between $MA\text{-}LA_x$ and $MB\text{-}LB_y$ under mechanical agitation is

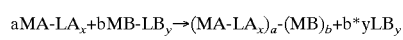

$$aMA\text{-}LA_x + bMB\text{-}LB_y \rightarrow (MA\text{-}LA_x)_a\text{-}(MB)_b + b^*yLB_y$$

The reaction between niobium oxalate and lead acetate (described in Example 1) belongs to the above family of reactions. Lead (Pb2+) has a higher tendency to bond with the oxalic group than with the acetic group in solid state. Hence the above solid-state reaction is thermodynamically favored. At the end of the reaction, the acetic acid groups should be liberated from the lead acetate. This model is consistent with the results of Example 1 of this invention. The solid-state reaction product obtained in this example does not contain acetic acid after drying in air. Based on these experimental results, a most preferred example of ligand LA is oxalic acid, and a most preferred example of ligand LB is acetic acid.

It is preferred that LA is at least bidental. This means that LA has the possibility of coordinating with at least two metal atoms or metal ions. Hence, the composition LA can be more completely written as $L\text{-}(A1)(A2)\ldots(An)$, where A1, A2, . . . , and An are the coordinating groups in the LA ligand. In a preferred case, at least one function group A1 forms a strong bond with metal ion MA. The other functional groups A2, A3, . . . , and An preferably form relative weak bonds or no bonds with MA. If the functional groups A2, A3, . . . , and An do not form bonds with MA, they are potentially able to form bonds with a metal MB which are stronger than the MB-LB bonds. In such case, the ligand LB can be released as mechanochemical reaction proceeds. If A2, A3, ..., and An form weak bonds with metal MA, but stronger bonds with metal MB, these weakly bonded interactions of these ligand groups with MA can be replaced by interactions with MB. In this latter case, the compounds MA-LA and MB-LB can simply bond together to form the precursor molecules during mechanochemical reaction. In this special case, LA can be the same as LB.

It is preferred that the ligand molecules only contain carbon, hydrogen, oxygen, and nitrogen. This preference comes from the fact that these elements (other than oxygen) in the organic ligands must be burned out during the formation of the electroceramic. Carbon, hydrogen, and nitrogen can be easily oxidized into volatile molecules and removed from the ceramic precursor. However, elements like chlorine, fluorine, sulfur, phosphor etc. can form stable compounds which are difficult to remove even at very high temperatures. If unwanted elements can not be removed from the ligands, the resulting ceramic powder will contain various contaminates. In the worst cases, the resulting ceramic powder simply does not have the desired composition. Hence, oxygen and nitrogen are preferred as coordinating atoms in the ligands. Preferred examples of ligands for the processes of this invention are those found in the following molecules: acetic acid; oxalic acid; acetoacetic acid; 1,3-acetonedicarboxylic acid; acetonylacetone; aconitic acid; adipic acid; alanine; aminobutyric acid; aminocapric acid; aspartic acid; acetylacetonate; tartaric acid; trimellitic acids; glutaric acid; succinic acid; 1,3-diaminoacetone; 1,2-diaminopropane; 2,3-diaminopropionic acid; malonic acid; diethylenetriaminepentaactic acid; diethylenetriamine; fumaric acid; ethylenediaminetetraacetic acid; oxamic acid; folic acid; gallic acid; gluconic acid; glutamic acid; glycine; glycolic acid; glyoxylic acid; isonipecotic acid; lactic acid; fate acid; levulinic acid; malic acid; nipecotic acid; nitrilotriacetic acid; and phthalic acid.

Reactive metal complex for mechanochemical synthesis, as well as precursor metal complex for mechanochemical synthesis, mean a compound that reacts during a mechanochemical process to provide a desired product or product precursor. All reactive compounds used for the processes of this invention can be in either solid or liquid forms under the conditions used for mechanochemical synthesis. In addition, one or more reactive compounds for the processes of this invention can be in a gaseous state under the conditions used for mechanochemical synthesis, as long as at least one other reactive compound used in the process is either a solid or a liquid under the conditions used for mechanochemical synthesis.

The mechanochemical reactions of the processes of the present invention can be caused by various grinding methods. Prior to commingling for the mechanochemical process, it is preferred that the starting materials are initially separately ground into an average particle size less than one millimeter, more preferred less than 200 micrometers, and most preferably less than 50 micrometers. In order to obtain these average particle dimensions, the starting materials can be mechanically ground under either a dry or wet condition. When a wet grinding method is used, the liquid used for the grinding process is preferably one that is largely chemically inert during the mechanochemical process. Preferred wet grounding aids are alcohols, acetone, water, and hydrocarbons (such as hexane and toluene). The ground starting materials are commingled, and then ground together so that mechanochemical reaction can occur among them. Again the grounding can be carried out under either a dry or wet condition. A wet grinding process is preferred. It is further preferred that the liquid used to facilitate the grinding process does not react with either the starting materials or the final product.

The energy used for the grinding process can vary over wide ranges depending upon the mechanochemical reactivity of the ground materials. Low energy ball-milling, attrition milling, vibratory milling, and like low energy grinding processes known in the art of grinding are preferred over high energy milling processes (because the milling medium can cause contamination from wear when high energy milling is used). The grinding media are preferred not to react with the starting materials and products. Such grinding media can be alumina, zirconia, silicon carbide, and like materials. When high energy milling is needed because of low reactivity of the materials undergoing mechanochemical transformation, high energy ball milling, planetary milling, and like methods can be used. Depending upon the reactivity of the milled materials and the intensity of the milling process, milling times that are preferred range from 5 minutes to longer than one day. When the reactivity of the milled material is low, the milling process can advantageously be conducted at high temperatures. Such high temperatures are preferably between room temperature and 300° C.

The temperature used for decomposing the product prepared by the mechanochemical method is preferably above 200° C., more preferably above 400° C., and most preferably above 600° C. Depending on the phase required, subsequent thermal treatment temperatures can be optionally provided. For example, in the mechanochemical preparation of lead metaniobate, thermal decomposition at 600° C. provided a ceramic powder that is a mixture of various phases, with rhombohedral lead metaniobate as the major phase. Further treatment at 900° for five hours resulted in the formation of pure rhombohedral lead metaniobate phase. If this powder is treated at 1300° C. for five minutes, the resulting phase will be piezoelectric, orthorhombic lead metaniobate. Likewise, when preparing lead titanate, thermal treatment at 600° C. for five hours produced a pure and highly crystalline perovskite phase. Thus, post-mechanosynthesis thermal treatments can be used to control phase formation in the product ceramic.

We have demonstrated that this mechanochemical route can be used to produce high quality lead metaniobate powder, as well as other ceramics for ferroelectric applications, as well as other uses. In the critically important first step, a lead metaniobate precursor (which is believed polymeric) was prepared by the mechanochemical solid-state reaction between lead acetate and niobium oxalate at room temperature. This mechanochemical reaction was caused by mechanical grinding of a stoichiometric powder mixture of lead acetate and niobium oxalate. Next, the product produced by the mechanical grinding step was decomposed by thermal treatment at 600° C. for a few hours. The resulting product powder contains approximately 50% rhombohedral lead metaniobate. Further treatment of this powder at 900° C. for five hours provided the desired high purity rhombohedral phase of lead metaniobate. Additional thermal treatment of the rhombohedral lead metaniobate at 1300° C. provided the ferroelectric orthorhombic phase of lead metaniobate as a high purity product.

The following specific examples are presented to more particularly illustrate the invention, and should not be construed as being limitations on the scope of the invention.

EXAMPLE 1

This example shows that mechanical treatment of a mixture of niobium oxalate and lead acetate powders generates a polymeric organometallic precursor for lead metaniobate. Because of the batch-to-batch variation in the niobium concentration for commercially purchased niobium oxalate (having an approximate formula $Nb(C_2O_4H)_5 \cdot xH_2O$), the content of niobium in the niobium oxalate was determined by measuring the weight of niobium oxide ($Nb_2O_5$) resulting from treating niobium oxalate at 1000° C. for one hour. This measurement indicates that niobium oxalate from Advanced Materials, Inc. contains 20.52 weight percent niobium oxide, which corresponds to the approximate formula $Nb(C_2O_4H)_5 \cdot 6H_2O$. Niobium oxalate (Advanced Materials Inc., 31.39 g) and lead acetate (Aldrich, 99.99+%, 9.19 g, containing three moles of co-crystallized water) were ground in hexane using a pestle and a mortar to produce a relatively fine powder. Hexane served as a medium to prevent small particles from becoming airborne, as well as to facilitate the grounding process. Neither reactants nor products are soluble in hexane or react with this solvent, except that acetic acid by product has some solubility in hexane. The observed release of acetic acid during this grinding process indicates that a reaction occurred between niobium oxalate and lead acetate. The roughly ground powder was further ball-milled using a zirconia grinding medium (zirconia balls) in hexane. Three distinctive stages were observed as the ball milling progressed. At the beginning, the powder in hexane is a slurry in which the powder precipitates very quickly after milling is interrupted. After further milling for about one hour, a white gel formed and the powder and hexane were indistinguishable. This indicates that niobium oxalate further reacted with lead acetate and a polymeric material formed. Additional milling for about five hours provided a glue-flake-like powder in hexane (and attached to the zirconia balls). This glue-flake-like powder rapidly precipitated after the end of the milling process. The odor of acetic acid was extremely strong upon opening the milling bottle. After removing the hexane and zirconia balls and drying the resulting product in air, a very fine white powder was obtained. The infrared (IR) spectra of the starting materials and final product were recorded by a Mason FT-IR spectrophotometer using KBr pellets. The intensity and locations of the IR absorption peaks are provided below, where we use weak (w), medium (m), and strong (s) to denote peak intensity. The IR spectrum of niobium oxalate is: 3553m (shoulder), 3441s, 1760w, 1718s, 1687s, 1400m, 1253m, 1230w, 1127w, 958m, 911w, 805w, 724w, 570w, 546w, 484w. The IR spectrum of lead acetate is: 3418m, 1557s, 1409s, 1341 m, 1049w, 1017w, 935w, 665m, 618w, 468w. The IR spectrum of the final product is: 3562m (shoulder), 3484m (shoulder), 3446s, 1760w, 1718s, 1687s, 1400m, 1252m, 1230w, 1130w, 958m, 911 w, 805w, 724w, 570w, 546w, 496w. The IR spectrum of the final product does not have any features of lead acetate, indicating that lead acetate reacted completely with niobium oxalate. These spectra show that the major characteristics of the IR spectra of the final product and niobium oxalate are the same. This indicates that the basic structural nature of the niobium oxalate remained unchanged. However, the O—H stretching peaks have significantly changed, indicating that the surrounding environment of crystallized water molecules has been substantially modified. Thermogravimetric and differential thermal analyses (TG/DTA) were carried out for niobium oxalate and the product. The TG/DTA data (obtained at a heating rate of 10° C./min) show that the thermal decomposition of niobium oxalate is completed at about 200° C. with a weight loss of 73%. There are three endothermic peaks at about 90, 125, and 190° C., respectively. The peak at 190° C. is the highest, the peak at 90° C. medium, and the peak at 125° C. is lowest. The TG/DTA of the final product also has three endothermic peaks below 200° C. They are at similar positions to these of niobium oxalate, but the peak height at 90° C. is maximum and that at 200° C. is minimum. The thermal decomposition of the final product is not complete at 200° C., where the total weight loss is 54%. Since the IR spectrum of the final product shows no indication of the presence of acetic acid, the final product of the mechanochemical process likely corresponds to the approximate formula $[(C_2O_4H)_4Nb(C_2O_4)]_2 \cdot 15H_2OPb$ (FW=1552). Most of the above weight loss below 200° C. can be accounted for by the loss of eight $C_2O_4H$ groups and fifteen waters (theoretically 59% weight loss) if the product resulting at 200° C. is assumed to have the formula $[O_2Nb(C_2O_4)]_2Pb$ (FW=631). The additional weight loss occurring between 200 and 320° C., is associated with two exothermic peaks at 220 and 310° C. These two peaks are associated with the loss of two $C_2O_4^{2-}$ groups. The higher stability of these two oxalic groups indicates that they are in an environment that is completely different from the other three oxalic groups, or those oxalic groups in niobium oxalate. We assumed that these two stable oxalic groups form bridges between Nb and Pb, i.e., $(O_2.Nb$—O—COCO—O—Pb—O—COCO—O—$NbO_2)_x$. Based on the above experimental observations, the following possible reaction mechanism is proposed.

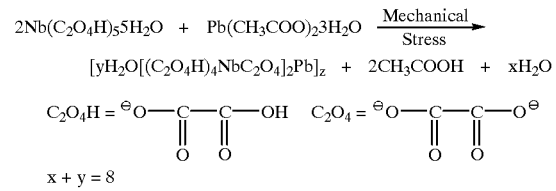

EXAMPLE 2

This example demonstrates that the desired rhombohedral lead metaniobate, which is precursor to the desired orthorhombic phase, can be easily obtained in pure form by calcinating the polymeric organometallic precursor prepared in Example 1. This result contrasts with that obtained by the direct calcination of the metal salt mixture of example 1 (niobium oxalate and lead acetate), which does not result in the desired phase. After calcinating the polymeric organometallic precursor produced in Example 1 for 5 hours at 600° C., a slightly yellow powder was obtained. The powder x-ray diffraction pattern indicates that the powder is a mixture of lead metaniobate that has a rhombohedral crystal symmetry and a cubic $Pb_3Nb_4O_{13}$ phase. Further sintering the calcinated powder at 900° C. for 5 hours offered the desired pure rhombohedral phase of lead metaniobate phase. The absence of impurity-associated lines in the x-ray powder diffraction indicates this high degree of phase and chemical purity. A scanning electron microscopy investigation of the rhombohedral phase indicates that the particles are rounded (somewhat egg shaped) and the maximum particle dimension is between about 3 μm and 0.1 μm.

EXAMPLE 3

This example shows that increasing the length of time that the salts of Example 1 are mechanically ground increases the content of the rhombohedral lead metaniobate that results when the ground product is calcinated at 600° C. Samples were prepared according to Example 1. The intensity of the powder x-ray diffraction line at 2θ=51.87° (for CuKα radiation) relative to that at 2θ=29.24° was used to provide an indication of the relative amount of the rhombohedral phase lead metaniobate (since the former line arises exclusively from the rhombohedral phase and the latter line arises from both the rhombohedral phase and an undesired phase). For the sample that was ball-milled for about 5 hours, this line intensity at 2θ=51.87° was found to be 11% relative to the intensity for the peak at 2θ=29.24° The same line was found to be about 17% in relative intensity for the sample that was ball-milled for about 14 hours. This line further increased to a relative intensity to 21% after milling for 46 hours. The relative intensity of this line in the pure rhombohedral phase is 35.4%. This result indicates that the longer the ball-milling time, the more completely the resultant product can be thermally converted to the rhombohedral lead metaniobate.

EXAMPLE 4

This example demonstrates that the piezoelectric active orthorhombic phase can be obtained by briefly heating (at 1300° C.) the sample prepared in Example 2. The rhombohedral phase powder obtained in Example 2 was heated at 1300° C. for 10 minutes. The appearance of the powder became much more yellow in color. The x-ray powder diffraction pattern indicates that this powder has an orthorhombic crystal symmetry. No impurity phases were evident in the x-ray powder diffraction pattern.

EXAMPLE 5

This example demonstrated the robustness of the preparation method described in the above examples. Two differently sized ball-milling media were selected. These media have a cylindrical shape. One medium has a weight of 3.4 g, a diameter of 0.95 cm, and a height of about 1 cm, while the other has a weight of 7.2 g, a diameter of 1.25 cm and a height of 1.27 cm. The ball milling time varied from 5 hours to ten days. It was found that a ball milling time longer than five days actually decreased the amount of the rhombohedral phase when the precursor was calcinated at 600° C. for five hours. However, independent of milling time, when the sample was further treated at 900° C. for five hours, the only phase that could be found by powder diffraction measurements was the rhombohedral lead metaniobate. The ball size has no significant effect on the reaction. This shows that the powder processing method is extremely robust.

EXAMPLE 6

This example shows the synthesis of a precursor polymeric material that can be used to make a high quality powder of lead magnesium niobate (PMN). Magnesium acetate containing four crystallization waters was used as the source of magnesium in the synthesis of PMN. Since it is hygroscopic, the content of magnesium oxide was determined by treating the above magnesium acetate (10.42 g) at 1000° C. for one hour in air. The weight of the residue oxide was 1.947 g. Thus, this magnesium acetate contains 18.69% of MgO (FW=40.31). This result agrees well with the MgO content calculated for the formula $Mg(C_2H_3O_2)_2 \cdot 4H_2O$ (FW=214.5), which is 18.79%. $Pb(C_2H_3O_2)_2 \cdot 3H_2O$ (9.00 g, 0.0237 mole), $Mg(C_2H_3O_2)_2 \cdot 4H_2O$ (1.70 g, 0.00791 mole), and niobium oxalate (10.25 g, 0.0158 mole) were ground together using a pestle and a mortar to produce a relatively fine powder in hexane. Hexane served as a medium to prevent small particles from becoming airborne, as well as to facilitate the grounding process. Neither reactants nor products were soluble in hexane or react with this solvent. The observed release of acetic acid during this grinding process indicates that reactions occurred among niobium oxalate, lead acetate, and magnesium acetate. The roughly ground powder was further ball-milled using a zirconia grinding medium (zirconia balls) in hexane. At the beginning, the powder in hexane is a slurry in which the powder precipitates very quickly after milling is interrupted. After further milling for about one hour, a white glue-like material formed and stuck on the grinding medium. This indicates that niobium oxalate further reacted with lead acetate and a polymeric material formed. Additional milling did not lead to any change, in contrast to the case of the reaction between niobium oxalate and lead acetate. The odor of acetic acid was extremely strong upon opening the milling bottle. After removing the hexane and zirconia balls and drying the resulting product in air, a very fine white powder was obtained.

EXAMPLE 7

This example demonstrated that the precursor prepared in Example 6 can be used to make high quality PMN ceramic powder. The fraction of the perovskite phase was calculated using $$\% \text{ perovskite} = \frac{I_{perov}}{I_{perov} + I_{pyroc}} \times 100$$

where $I_{perov}$ (110) and $I_{pyroc}$ (222) are the powder x-ray diffraction line intensities (CuKα radiation) at Bragg 2θ angles of 31.2° and 29.1°, respectively. The dried powder in Example 6 was calcinated at 600° C. for five hours. The resulting powder contains mainly the pyrochlore phase (93.1%). The perovskite PMN is the minor phase. Further calcinating the same powder at 750° C. for five hours provided a powder containing 95.1% perovskite PMN. In contrast to the prior art claim that the pyrochlore phase is very stable and inert, the pyrochlore phase formed from the precursor in this invention was very reactive. The fraction of the perovskite PMN increased to 98% after treating the above powder at 850° C. for five hours. Thermal treatment at 900° C. for 12 hours gave a powder containing more than 99% perovskite PMN.

EXAMPLE 8

This example supplements that in Example 7 by providing additional information on the effect of thermal treatment process (temperature and time) during calcination on the formation of the perovskite phase of the PMN. The relative phase yield was determined by diffraction measurements, as described in Example 7. All samples were ball milled for 85 hours prior to the calcination. As can be seen from Table I, a 5 hour thermal treatment at 600° C. provided a low yield of the perovskite phase (only 6.98%). Additional thermal treatment at 750° C. for 5 hours produce more than 95% perovskite phase, while additional treatment at 850° C. for 5 hours give more than 97% perovskite phase. When the additional treatment was carried out at higher temperature, 900° C., more perovskite phase (>98%) was obtained. The amount of the perovskite phase was above 99% when the thermal treatment time was increased from 2 hours to 12 hours. The perovskite yield did not significantly depend upon whether or not the calcination was on a compressed pellet (formed at 2500 psi. in a cylindrical die) or a powder.

TABLE 1

Dependence of the content of perovskite phase of PMN on the thermal annealing conditions (temperature and time).

| T (° C.)/time (hr) | $I_{perov}$ (110) | $I_{pyroc}$ (222) | % Perovskite |
|---|---|---|---|
| 600/5 | 7.5 | 100 | 6.98 |
| 600/5 + 750/5 | 100 | 5.2 | 95.06 |
| 600/5 + 850/3.5* | 100 | 3.2 | 96.90 |
| 600/5 + 850/5* | 100 | 1.5 | 98.52 |
| 600/5 + 850/5 | 100 | 2.2 | 97.85 |
| 600/5 + 900/2 | 100 | 1.6 | 98.43 |
| 600/5 + 900/(2 + 5) | 100 | 1.1 | 98.91 |
| 600/5 + 900/(2 + 5 + 5) | 100 | 1.0 | 99.01 |

*Thermally treated in pellet form, as opposed to the powder form used for the other runs.

EXAMPLE 9

This example supplements that in Examples 7 and 8 by providing additional information on the dependence of yields of the perovskite and pyrochlore phases of PMN on the ball milling time. The relative phase yield provided in Tables 2–4 was determined by diffraction measurements, as described in Example 7.

TABLE 2

Dependence of the content of perovskite phase of PMN on the milling time (thermally treated at 600° C. for 5 hours after milling).

| Milling time (hr) | $I_{perov}$ (110) | $I_{pyroc}$ (222) | % Perovskite |
|---|---|---|---|
| 5 | 5.4 | 100 | 5.1 |
| 85 | 7.5 | 100 | 7.0 |
| 90* | 5.2 | 100 | 4.9 |
| 140 | 7.9 | 100 | 7.3 |
| 200 | 84 | 100 | 46 |

*0.6% extra magnesium in the original mixture.

TABLE 3

Dependence of the content of perovskite phase of PMN on the milling time (thermally treated at 600° C. for 5 hours, followed by 900° C. for 5 hours after milling).

| Milling time (hr) | $I_{perov}$ (110) | $I_{pyroc}$ (222) | % Perovskite |
|---|---|---|---|
| 5 | 100 | 3.9 | 96 |
| 85* | 100 | 1.6 | 98 |
| 90** | 100 | 5.4 | 95 |
| 200 | 100 | 19 | 77 |

*Thermally treated at 600° C. for 5 hours, followed by 900° C. for 2 hours
**0.6% extra magnesium in the original mixture.

TABLE 4

Dependence of the content of pervoskite phase of PMN on the milling time (thermally treated at 600° C. for 5 hours, followed by 900° C. for 10 hours).

| Milling time (hr) | $I_{perov}$ (110) | $I_{pyroc}$ (222) | % Perovskite |
|---|---|---|---|
| 5 | 100 | 2.6 | 98 |
| 85* | 100 | 1.6 | 99 |
| 90** | 100 | 4.1 | 96 |
| 140 | 100 | 7.2 | 93 |
| 200 | 100 | 19 | 84 |

*Thermally treated at 600° C. for 5 hours, followed by 900° C. for 2 + 5 hours.
**0.6% extra magnesium in the original mixture.

EXAMPLE 10

This example shows that high quality lead titanate powder can be prepared at very low temperatures by the methods of this invention. Titanium oxalate ($TiO(HC_2O_4)_2.xH_2O$) was thermally decomposed at 1000° C. It was found that this titanium oxalate contains 22.16% titanium oxide, indicating that it has an approximate formula $TiO(HC_2O_4)_2.6H_2O$. This titanium oxalate (10.00 g, 0.02273) and $Pb(C_2H_3O_2)_2.3H_2O$ (10.25 g, 0.02273 mole) were ground using a pestle and a mortar to produce a relatively fine powder in hexane. Hexane served as a medium to prevent small particles from becoming airborne, as well as to facilitate the grounding process. Neither reactants nor products are soluble in hexane or react with this solvent. The observed release of acetic acid during this grinding process, indicates that reaction occurred between titanium oxalate and lead acetate. The roughly ground powder was further ball-milled using a zirconia grinding medium (zirconia balls) in hexane. At the beginning, the powder in hexane is a slurry in which the powder precipitates very quickly after milling is interrupted. After further milling for about one hour, a white glue-like material formed and stuck on the grinding medium. This indicates that titanium oxalate further reacted with lead acetate and a polymeric material formed. The odor of acetic acid was extremely strong upon opening the milling bottle. After removing the hexane and zirconia balls and drying the resulting product in air, a very fine white powder was obtained. The powder was treated at 600° C. for five hours. The powder x-ray diffraction pattern shows that the powder has a well crystallized perovskite structure. No impurity phases were evident in the x-ray diffraction pattern. The only effect of further treatment at 850° C. for five hours was to increase the sharpness of the diffraction peaks, indicating that the crystal size increased.

EXAMPLE 11

This example shows that high quality lead titanate zircornate powder can be prepared using the presently disclosed process methods. Zirconium oxalate ($ZrO(C_2O_4).xH_2O$) was thermally decomposed at 1000° C. It was found that this zirconium oxalate contains 43.84% zirconium oxide, corresponding to an approximate formula $ZrO(C_2O_4).4H_2O$. Titanium oxalate (4.563 g, 0.01265 mole), zirconium oxalate (3.853 g, 0.01371 mole), and $Pb(C_2H_3O_2)_2.3H_2O$ (10.00 g, 0.02636 mole) were ground using a pestle and a mortar to produce a relatively fine powder in hexane. Hexane served. as a medium to prevent small particles from becoming airborne, as well as to facilitate the grounding process. Neither reactants nor products are soluble in hexane or react with this solvent. The observed release of acetic acid during this grinding process, indicates that reaction occurred among titanium oxalate, zirconium oxalate, and lead acetate. The roughly ground powder was further ball-milled using a zirconia grinding medium (zirconia balls) in hexane. At the beginning, the powder in hexane is a slurry in which the powder precipitates very quickly after milling is interrupted. After further milling for about one hour, a white glue-like material formed and stuck on the grinding medium. This indicates that titanium oxalate and zirconium oxalate further reacted with lead acetate and a polymeric material formed. The odor of acetic acid was extremely strong upon opening the milling bottle. After removing the hexane and zirconia balls and drying the resulting product in air, a very fine white powder was obtained. The powder was treated at 600° C. for five hours, and further treated at 850° C. for five hours. The powder x-ray diffraction pattern shows that the powder has a well crystallized perovskite structure.

EXAMPLE 12

This example shows that barium titanate powder can be prepared by the methods of this invention. Titanium oxalate (10.00 g, 0.02273) and $Ba(C_2H_3O_2)_2$ (7.083 g, 0.02273 mole) were ground using a pestle and a mortar to produce a relatively fine powder in hexane. Neither the reactants nor reaction products are soluble in hexane or react with this solvent. The observed release of acetic acid during this grinding process indicates that reaction occurred between titanium oxalate and barium acetate. The roughly ground powder was further ball-milled using a zirconia grinding medium (zirconia balls) in hexane. At the beginning, the powder in hexane was a slurry in which the powder precipitates very quickly after milling is interrupted. After further milling for about 5 hours, a white glue-like material formed and stuck on the grinding medium. This indicates that titanium oxalate further reacted with barium acetate and a polymeric material formed. The odor of acetic acid was extremely strong upon opening the milling bottle. After removing the hexane and zirconia balls and drying the resulting product in air, a very fine white powder was obtained. The powder was treated at 600° C. for five hours and at 805° C. for five hours. The powder x-ray diffraction pattern shows that the powder contains the desired perovskite phase, as well as a $Ba_2TiO_4$ phase. A high temperature thermal treatment can be used to decrease the amount of $Ba_2TiO_4$.

What is claimed is:

1. A ferroelectric ceramic powder of substantially single-phase orthorhombic lead metaniobate made by a process comprising the steps of:
   (a) mechanically grinding together two or more precursor components, at least one of which is an organometallic compound containing a metallic element of said ceramic, so that a polymerization or oligomerization reaction of said organometallic compound occurs, and
   (b) thermally treating the reaction product of said mechanical grinding so that the ceramic powder is produced,
       wherein the ceramic powder contains essentially no chlorine.

2. The ferroelectric ceramic powder according to claim 1, wherein the mechanical grinding process is one of ball milling and/or attrition milling.

3. The ferroelectric ceramic powder according to claim 1, wherein the organometallic precursor contains a carboxylic acid.

4. The ferroelectric ceramic powder according to claim 3, wherein the organometallic compound is a metal oxalate.

5. The ferroelectric ceramic powder according to claim 3, wherein the organometallic compound is a metal acetate.

6. The ferroelectric ceramic powder according to claim 1, wherein the precursor components are at least two organometallic compounds.

7. The ferroelectric ceramic powder according to claim 6, wherein the organometallic compounds include a metal oxalate and a metal acetate.

8. The ferroelectric ceramic powder according to claim 7, wherein the organometallic compounds contain the same ligands, but different metals.

9. The ferroelectric ceramic powder according to claim 1, wherein mechanochemical reaction results in elimination of a volatile.

10. The ferroelectric ceramic powder according to claim 9, wherein the volatile is acetic acid.

11. The ferroelectric ceramic powder according to claim 1, wherein the organometallic compound comprises elemental metal, carbon, and hydrogen and optionally oxygen and/or nitrogen.

12. The ferroelectric ceramic powder according to claim 1, wherein the organometallic compound has at least one ligand selected from the group of starting materials consisting of:
    1,3-acetonedicarboxylic acid, acetonylacetone, aconitic acid, adipic acid, alanine, aminobutyric acid, aminocaproic acid, aspartic acid, acetylacetonate, tartaric acid, trimellitic acids, glutaric acid, succinic acid, 1,3-diaminoacetone, 1-diaminopropane, 2,3-diaminopropionic acid, malonic acid, diethylenetriaminepentaacetic acid, diethylenetriamine, fumaric acid, ethylenediaminetetraacetic acid, oxamic acid, folic acid, gallic acid, gluconic acid, glutamic acid, glycine, glycolic acid, glyoxylic acid, isonipecotic acid, lactic acid, fate acid, levulinic acid, malic acid, nipecotic acid, nitrilotriacetic acid, and phthalic acid.

13. The ferroelectric ceramic powder according to claim 1, wherein at least one precursor compound is liquid and at least one precursor compound is solid.

14. The ferroelectric ceramic powder according to claim 1, wherein all precursor compounds are liquid.

15. The ferroelectric ceramic powder according to claim 1, wherein all precursor compounds are solid.

16. A ferroelectric ceramic powder of lead magnesium niobate which contains greater than 98% perovskite lead magnesium niobate and less than 1% pyrochlore phase made by a process comprising the steps of:
    (a) mechanically grinding together two or more precursor components, at least one of which is an organometallic compound containing a metallic element of said ceramic, so that a polymerization or oligomerization reaction of said organometallic compound occurs, and
    (b) thermally treating the reaction product of said mechanical grinding so that a ceramic powder is produced;
        wherein the ceramic powder contains metals selected from the group consisting of lead, magnesium and niobium; and
        wherein the ceramic powder contains essentially no chlorine.

17. The ferroelectric ceramic powder according to claim 16, wherein the mechanical grinding process is one of ball milling and/or attrition milling.

18. The ferroelectric ceramic powder according to claim 16, wherein the organometallic precursor contains a carboxylic acid.

19. The ferroelectric ceramic powder according to claim 18, wherein the organometallic compound is a metal oxalate.

20. The ferroelectric ceramic powder according to claim 18, wherein the organometallic compound is a metal acetate.

21. The ferroelectric ceramic powder according to claim 16, wherein the precursor components are at least two organometallic compounds.

22. The ferroelectric ceramic powder according to claim 21, wherein the organometallic compounds include a metal oxalate and a metal acetate.

23. The ferroelectric ceramic powder according to claim 21, wherein the organometallic compounds contain the same ligands, but different metals.

24. The ferroelectric ceramic powder according to claim 16, wherein mechanochemical reaction results in elimination of a volatile.

25. The ferroelectric ceramic powder according to claim 24, wherein the volatile is acetic acid.

26. The ferroelectric ceramic powder according to claim 16, wherein the organometallic comprises elemental metal, carbon, hydrogen, and optionally oxygen and/or nitrogen.

27. The ferroelectric ceramic powder according to claim 16, wherein the organometallic compound has at least one ligand selected from the group of starting materials consisting of:

1,3-acetonedicarboxylic acid, acetonylacetone, aconitic acid, adipic acid, alanine, aminobutyric acid, aminocaproic acid, aspartic acid, acetylacetonate, tartaric acid, trimellitic acids, glutaric acid, succinic acid, 1,3-diaminoacetone, 1-diaminopropane, 2,3-diaminopropionic acid, malonic acid, diethylenetriaminepentaacetic acid, diethylenetriamine, fumaric acid, ethylenediaminetetraacetic acid, oxamic acid, folic acid, gallic acid, gluconic acid, glutamic acid, glycine, glycolic acid, glyoxylic acid, isonipecotic acid, lactic acid, fate acid, levulinic acid, malic acid, nipecotic acid, nitrilotriacetic acid, and phthalic acid.

28. The ferroelectric ceramic powder according to claim 16, wherein at least one precursor compound is liquid and at least one precursor compound is solid.

29. The ferroelectric ceramic powder according to claim 16, wherein all precursor compounds are liquid.

30. The ferroelectric ceramic powder according to claim 16, wherein all precursor compounds are solid.

31. A ferroelectric ceramic powder of lead magnesium niobate which contains greater than 98% perovskite lead magnesium niobate made by a process comprising the steps of:

(a) mechanically grinding together two or more precursor components, at least one of which is an organometallic compound containing a metallic element of said ceramic, so that a polymerization or oligomerization reaction of said organometallic compound occurs, and (b) thermally treating the reaction product of said mechanical grinding so that a ceramic powder is produced;

wherein the ceramic powder contains metals selected from the group consisting of lead, magnesium and niobium; and wherein the ceramic powder contains essentially no chlorine; and wherein the ceramic powder of lead magnesium niobate contains above 99% perovskite lead magnesium niobate.

* * * * *